(12) United States Patent
Lee et al.

(10) Patent No.: US 9,632,234 B2
(45) Date of Patent: Apr. 25, 2017

(54) LIGHT GUIDE PLATE, BACKLIGHT UNIT INCLUDING THE SAME AND LIQUID CRYSTAL DISPLAY INCLUDING THE BACKLIGHT UNIT

(71) Applicant: SAMSUNG DISPLAY CO., LTD., Yongin-si, Gyeonggi-do (KR)

(72) Inventors: Joo Young Lee, Yongin (KR); Eun Ju Shin, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 244 days.

(21) Appl. No.: 13/937,425

(22) Filed: Jul. 9, 2013

(65) Prior Publication Data

US 2014/0043559 A1  Feb. 13, 2014

(30) Foreign Application Priority Data

Aug. 8, 2012 (KR) .................. 10-2012-0086877

(51) Int. Cl.
*F21V 8/00* (2006.01)
*G02F 1/1335* (2006.01)

(52) U.S. Cl.
CPC .......... *G02B 6/0088* (2013.01); *G02B 6/0011* (2013.01); *G02B 6/0081* (2013.01); *G02F 1/1336* (2013.01); *G02F 1/133524* (2013.01)

(58) Field of Classification Search
CPC .. G02B 6/0088; G02B 6/0081; G02B 6/0011; G02F 1/1336; G02F 1/133624
USPC ...................... 349/58, 65; 362/628
See application file for complete search history.

(56) References Cited

U.S. PATENT DOCUMENTS

| 2004/0114345 A1* | 6/2004 | Kim et al. ............. 362/31 |
| 2005/0078469 A1* | 4/2005 | Jeong ............. 362/31 |
| 2008/0278656 A1* | 11/2008 | Yuan ............. 349/58 |
| 2013/0038817 A1* | 2/2013 | Hirayama et al. ........ 349/65 |

FOREIGN PATENT DOCUMENTS

| KR | 10-1998-014148 A | 5/1998 |
| KR | 20-1998-022603 U | 7/1998 |
| KR | 10-0176190 B1 | 11/1998 |
| KR | 10-0291242 B1 | 3/2001 |
| WO | WO 2011/135907 | * 12/2011 |

* cited by examiner

*Primary Examiner* — Dung Nguyen
(74) *Attorney, Agent, or Firm* — Lee & Morse P.C.

(57) ABSTRACT

A light guide plate includes an upper surface, a lower surface facing the upper surface, a first side surface connecting the lower surface to the upper surface, the first side surface including an inclined surface defining an acute angle with respect to the upper surface, and a second side surface connecting the upper surface and the lower surface, the second side surface being a rounded surface and facing the first side surface.

13 Claims, 5 Drawing Sheets

LIGHT GUIDE PLATE, BACKLIGHT UNIT INCLUDING THE SAME AND LIQUID CRYSTAL DISPLAY INCLUDING THE BACKLIGHT UNIT

CROSS-REFERENCE TO RELATED APPLICATION

This application claims priority under 35 U.S.C. §119 to and the benefit of Korean Patent Application No. 10-2012-0086877, filed on Aug. 8, 2012, in the Korean Intellectual Property Office, the disclosure of which is incorporated herein by reference in its entirety.

BACKGROUND

1. Field

Example embodiments relate to a light guide plate, to a backlight unit including the same, and to a liquid crystal display including the backlight unit. More particularly, example embodiments relate to a light guide plate, which can improve display quality of a liquid crystal display, a backlight unit including the same, and a liquid crystal display including the backlight unit.

2. Description of the Related Art

With the trend toward lighter and slimmer displays, including portable display devices, e.g., notebook computers, mobile phones, or PMPs, as well as home display devices, e.g., TV sets or monitors, a variety of flat panel displays are widely used. The flat panel displays may include, e.g., a liquid crystal display, an organic electroluminescent display device, an electrophoretic display device, and so on.

Among the flat panel displays, the liquid crystal display includes a liquid crystal panel and a light source. The liquid crystal panel includes a liquid crystal layer containing liquid crystal particles. According to the voltage applied to the liquid crystal layer, arrangement of liquid crystal particles varies, and the light transmittance of the liquid crystal layer varies accordingly. The liquid crystal display device includes a plurality of pixels and may display a desired image by controlling the voltage applied to the liquid crystal layer included in each of the plurality of pixels. The light source supplies the liquid crystal panel with light, and the liquid crystal panel may display an image by adjusting the transmittance of the light supplied from the light source.

The liquid crystal display may further include a light guide plate. The light guide plate may distribute light supplied from the light source throughout the liquid crystal panel. The light guide plate may have at least one ear portion outwardly protruding from its lateral surface to achieve convenient assembly and alignment.

SUMMARY

Example embodiments provide a light guide plate, which can improve display quality of a liquid crystal display, a backlight unit including the same, and a liquid crystal display including the backlight unit.

Example embodiments also provide a light guide plate, a backlight unit including the same, and a liquid crystal display including the backlight unit, which can facilitate assembly.

According to an aspect of the example embodiments, there is provided a light guide plate including an upper surface, a lower surface facing the upper surface, a first side surface connecting the lower surface to the upper surface, the first side surface including an inclined surface defining an acute angle with respect to the upper surface, and a second side surface connecting the upper surface and the lower surface, the second side surface being a rounded surface and facing the first side surface.

The light guide plate may further include a third side surface connecting the upper surface and the lower surface, and a fourth side surface connecting the upper surface and the lower surface, the fourth surface facing the third surface, and a distance between the upper surface and the lower surface along the fourth side surface being smaller than a distance between the upper surface and the lower surface along the third side surface.

The inclined surface of the first side surface may be connected to the lower surface.

The first side surface may further include a connecting surface between the upper surface and the inclined surface, the connecting surface connecting the upper surface and the inclined surface.

The connecting surface may be substantially perpendicular to the upper surface.

According to another aspect of the example embodiments, there is also provided a backlight unit including an accommodation member including a bottom part and sidewalls surrounding the bottom part, the sidewalls having a first sidewall, the first sidewall including a first sill portion protruding to the inside of the accommodation member, and a second sidewall facing the first sidewall, the second sidewall including a second sill portion protruding to the inside of the accommodation member, a distance between the first sill portion and the second sill portion being smaller than a distance between the first sidewall and the second sidewall, and a light guide plate in the accommodation member, the light guide plate being between the bottom part and the first and second sill portions, and the light guide plate including an upper surface adjacent to the first sill portion and the second sill portion, a lower surface facing the upper surface, a first side surface connecting the lower surface to the upper surface, the first side surface including an inclined surface defining an acute angle with respect to the upper surface, and a second side surface connecting the upper surface and the lower surface, the second side surface being a rounded surface and facing the first side surface.

The light guide plate may further include a third side surface connecting the upper surface and the lower surface, and a fourth side surface connecting the upper surface and the lower surface, the fourth surface facing the third surface, and a distance between the upper surface and the lower surface along the fourth side surface being smaller than a distance between the upper surface and the lower surface along the third side surface.

The backlight unit may further include a light source in the accommodation member, the light source being adjacent to the third side surface.

The backlight unit may further include a guide groove inside at least one of the first and second sill portions, the guide groove extending from an end of the at least one first or second sill portions toward an external surface of the accommodation member.

The backlight unit may further include an optical sheet on the upper surface of the light guide plate, the optical sheet including an ear portion protruding from a side surface and disposed inside the guide groove.

An end of the second sill portion may be round.

The first side surface may be positioned between the upper surface and the lower surface and further includes a connecting surface connecting the upper surface and the inclined surface.

The connecting surface may be substantially perpendicular with respect to the upper surface.

According to yet another aspect of the example embodiments, there is also provided a liquid crystal display including an accommodation member including a bottom part and sidewalls surrounding the bottom part, the sidewalls including a first sidewall, the first sidewall including a first sill portion protruding to the inside of the accommodation member, and a second sidewall facing the first sidewall, the second sidewall including a second sill portion protruding to the inside of the accommodation member, a distance between the first sill portion and the second sill portion being smaller than a distance between the first sidewall and the second sidewall, a light guide plate in the accommodation member, the light guide plate being between the bottom part and the first and second sill portions, and the light guide plate including an upper surface adjacent to the first sill portion and the second sill portion, a lower surface facing the upper surface, a first side surface connecting the lower surface to the upper surface, the first side surface including an inclined surface defining an acute angle with respect to the upper surface, and a second side surface connecting the upper surface and the lower surface, the second side surface being a rounded surface and facing the first side surface, and a liquid crystal panel positioned on the light guide plate.

The light guide plate may further include a third side surface connecting the upper surface and the lower surface, and a fourth side surface connecting the upper surface and the lower surface, the fourth surface facing the third surface, and a distance between the upper surface and the lower surface along the fourth side surface being smaller than a distance between the upper surface and the lower surface along the third side surface.

The liquid crystal display may further include a light source in the accommodation member, the light source being adjacent to the third side surface.

The liquid crystal display may further include an optical sheet on the upper surface of the light guide plate, the optical sheet including an ear portion protruding from its side surface, wherein at least one of the first and second sill portions including a guide groove recessed toward an external surface of the accommodation member, the ear portion of the optical sheet being inside the guide groove.

An end of the second sill portion may be round.

The first side surface may further include a connecting surface between the upper surface and the inclined surface and connecting the upper surface and the inclined surface.

The connecting surface may be substantially perpendicular to the upper surface.

BRIEF DESCRIPTION OF THE DRAWINGS

The above and other features and advantages will become more apparent by describing in detail preferred embodiments with reference to the attached drawings, in which.

DETAILED DESCRIPTION

Example embodiments will now be described more fully hereinafter with reference to the accompanying drawings, in which preferred embodiments are shown. Example embodiments may, however, be embodied in different forms and should not be construed as limited to those set forth herein. Rather, these embodiments are provided so that this disclosure will be thorough and complete, and will fully convey the scope of the inventive concept to those skilled in the art. Same reference numbers indicate the same components throughout the specification. In the attached figures, the thickness of layers and regions may b e exaggerated for clarity.

It will also be understood that when a layer (or element) is referred to as being "on" another layer or substrate, it can be directly on the other layer or substrate, or intervening layers may also be present. In contrast, when an element is referred to as being "directly on" another element, there are no intervening elements present.

Hereinafter, the example embodiments will be described in further detail with reference to the accompanying drawings.

Figure 1:
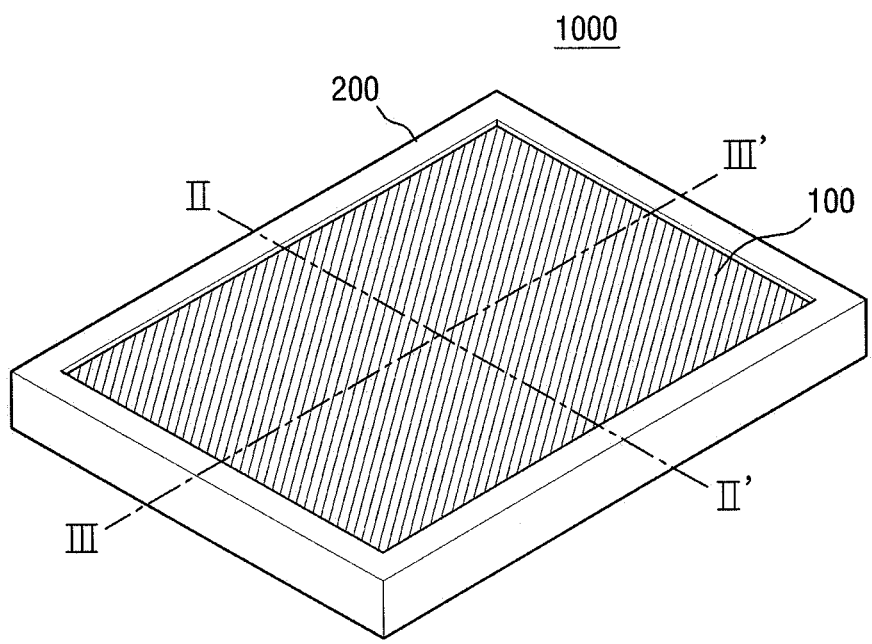
FIG. 1 is a perspective view of a liquid crystal display according to an embodiment.
Figure 2:
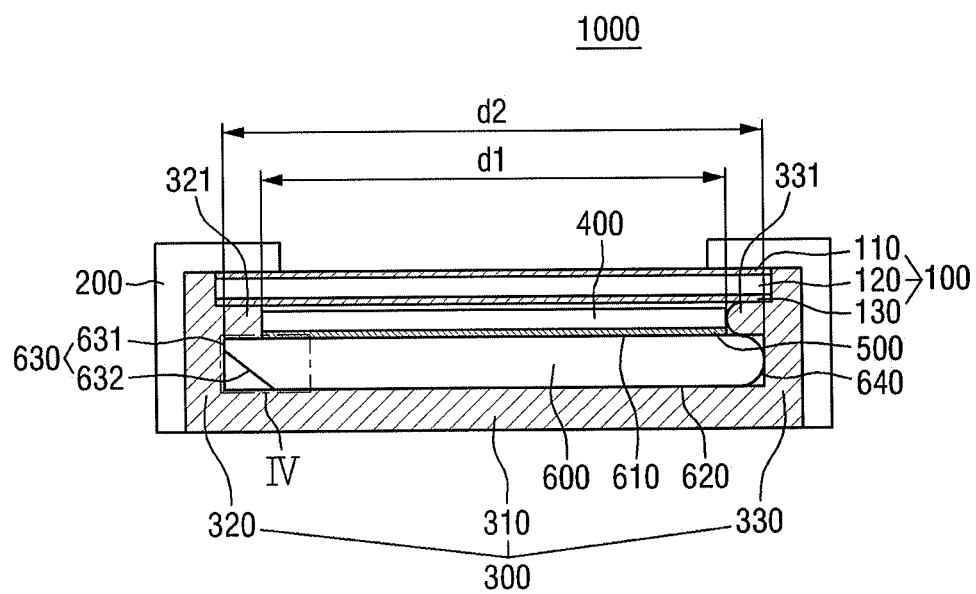
FIG. 2 is a cross-sectional view along line II-II' of FIG. 1.
Figure 3:
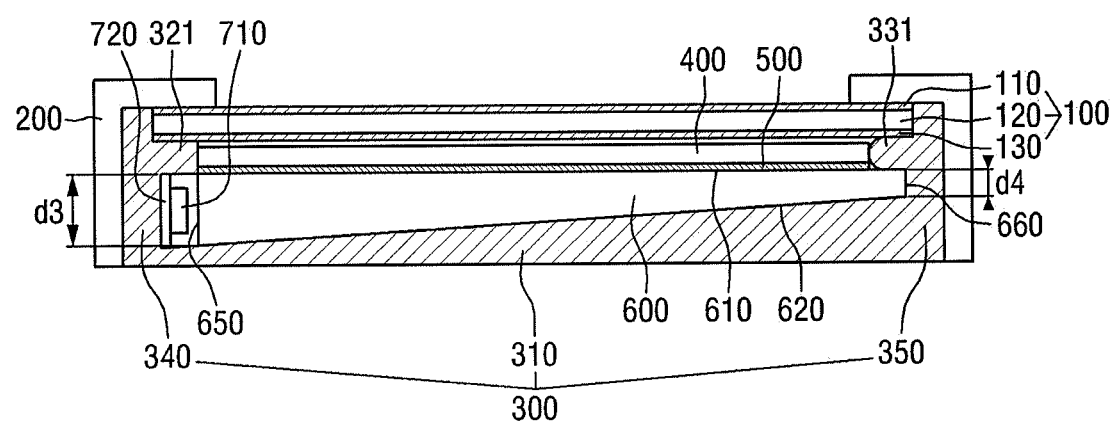
FIG. 3 is a cross-sectional view along line III-III' of FIG. 1.

FIG. 1 is a perspective view of a liquid crystal display according to an embodiment, FIG. 2 is a cross-sectional view along line II-II' of FIG. 1, and FIG. 3 is a cross-sectional view along line III-III' of FIG. 1.

Referring to FIGS. 1 to 3, a liquid crystal display 1000 includes an accommodation member 300, a light guide plate 600, and a liquid crystal panel 100.

The accommodation member 300 may accommodate the light guide plate 600, a light source 710, and an optical sheet 400, which will later be described. The accommodation member 300 may include a bottom part 310 and sidewalls 320, 330, 340, and 350. The sidewalls 320, 330, 340, and 350 extend upwardly from a periphery of the bottom part 310 and are shaped to surround the bottom part 310.

The sidewalls 320, 330, 340, and 350 may include first to fourth sidewalls 320, 330, 340 and 350, respectively. The first sidewall 320 and the second sidewall 330 may face each other, and the third sidewall 340 and the fourth sidewall 350 may face each other.

The first sidewall 320 and the second sidewall 330 may include a first sill portion 321 and a second sill portion 331, respectively, protruding toward the inside of the accommodation member 300. A distance d1 between the first sill portion 321 and the second sill portion 331 may be smaller than a distance d2 between a first side surface 630 and a second side surface 640 of the light guide plate 600. Therefore, the first sill portion 321 and the second sill portion 331 may prevent the light guide plate 600 accommodated in the accommodation member 300 from deviating, e.g., shifting, from the accommodation member 300. For example, an end of one of the first and second sill portions, e.g., an end of the second sill portion 331, may be round, so the light guide plate 600 may be easily inserted into a lower portion of the sill portion, e.g., easily slid below the second sill portion 331.

According to some embodiments, some regions of the sidewalls 320, 330, 340, and 350 may be formed as separate mold frames, i.e., separated from the other portions of the accommodation member 300.

As shown in FIG. 3, when a lower surface 620 of the light guide plate 600 is inclined, an upper surface of the bottom part 310 may also be inclined. However, aspects of the example embodiments are not limited thereto, e.g., the upper surface of the bottom part 310 may be planar.

The light guide plate 600 is disposed under the liquid crystal panel 100 and may distribute and supply the light from the light source 710 to the liquid crystal panel 100. The light guide plate 600 may include an upper surface 610, the lower surface 620, and and first to fourth side surfaces 630, 640, 650, and 660.

The upper surface 610 may be disposed to face the liquid crystal panel 100. The upper surface 610 may be a light exit surface through which light incident into the light guide plate from the light source 710 is emitted toward the liquid crystal panel 100.

The lower surface 620 may be disposed to face the upper surface 610. The lower surface 620 may be inclined with respect to the upper surface 610, e.g., at an oblique angle with respect to each of the third and fourth side surfaces 650 and 660. In more detail, the lower surface 620 may be inclined such that it is farther from the upper surface 610 in a region adjacent to the third side surface 650 than in a region adjacent to the fourth side surface 630. If the lower surface 620 is inclined with respect to the upper surface 610 toward the third and fourth side surfaces 650 and 660, light incident through the third side surface 650 can be efficiently transmitted from the light source 710 to the fourth side surface 660 when the light source 710 is disposed to be adjacent to the third side surface 650, thereby allowing the light guide plate 600 to evenly distribute the light.

Figure 4:
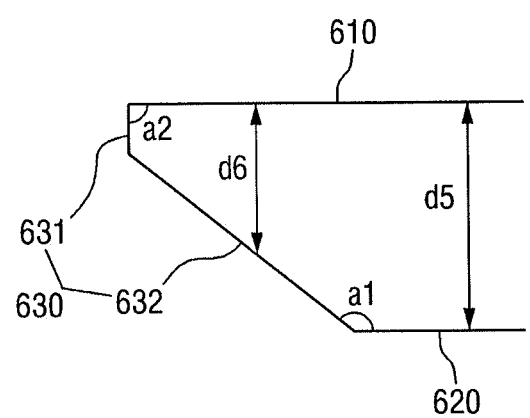
FIG. 4 is an enlarged view of region IV in FIG. 2.

The first side surface 630 is disposed to face the first sidewall 320 and may be positioned under the first sill portion 321. The first side surface 630 will now be described in more detail with reference to FIG. 4. FIG. 4 is an enlarged view of region IV in FIG. 2.

Referring to FIG. 4, the first side surface 630 includes an inclined surface 632. The inclined surface 632 forms an acute angle with respect to the upper surface 610. If the first side surface 630 includes the inclined surface 632 forming the acute angle with respect to the upper surface 610, an edge of the light guide plate 600 including the first side surface 630 may have a lower thickness than a distance between the upper and lower surfaces 610 and 620. In other words, if the distance between the upper and lower surfaces 610 and 620 is d5, a distance d6 i.e., a distance between the upper surface 610 to any point on the first side surface 630, may be smaller than the distance d5. It is noted that each of the distances d5 and d6 is normal to the upper surface 610.

As the edge of the light guide plate 600 including the first side surface 630 is thinner than the distance d5, and as the distance between the bottom surface 310 and the first sill portion 321 substantially equals that distance d5, the thickness of the edge of the light guide plate 600, i.e., the distance d6, is smaller than the distance between the bottom surface 310 and the first sill portion 321. As such, the first side surface 630 may be easily inserted below the first sill portion 321 to assemble the light guide plate 600 with the accommodation member 300. Accordingly, the light guide plate 600 or the accommodation member 300 may be prevented or substantially minimized from being deformed during assembly, thereby facilitating and simplifying the assembly.

The inclined surface 632 may be connected to the lower surface 620. An angle a1 formed between the inclined surface 632 and the lower surface 620 may be an obtuse angle.

The first side surface 630 may further include a connecting surface 631. The connecting surface 631 may be disposed between the upper surface 610 and the inclined surface 632 and may connect the upper surface 610 and the inclined surface 632 to each other. An angle a2 formed between the connecting surface 631 and the upper surface 610 may be substantially a right angle. If the first side surface 630 includes the connecting surface 631, the edge of the first side surface 630 of the light guide plate 630 may have a predetermined thickness, e.g., a sharp corner structure may be eliminated, thereby improving mechanical strength of the first side surface 630.

Referring back to FIGS. 1 to 3, the second side surface 640 may be disposed to face the first side surface 630. The second side surface 640 may have a round shape. If the second side surface 640 is round, the second side surface 640 may be easily inserted into the lower portion of the second sill portion 331 when the light guide plate 600 is fastened with the accommodation member 300.

The third side surface 650 and the fourth side surface 660 may be disposed to face each other. A thickness d3 of the third side surface 650, i.e., a distance between the upper surface 610 and the lower surface 620 along the third side surface 650, may be greater than a distance d4, i.e., a thickness of the fourth side surface 660 measured between the upper surface 610 and the lower surface 620. The third side surface 650 may be disposed to face the light source 710 and to be adjacent thereto. Since the distance d3 is greater than the distance d4, light incident into the third side surface 650 can be efficiently transmitted from the light source 710 to the fourth side surface 660, thereby allowing the light guide plate 600 to evenly distribute the light. According to other embodiments, distances d3 and d4 may be equal to each other, and the lower surface 620 may be parallel to the upper surface 610.

The liquid crystal panel 100 may be positioned on the upper surface 610 of the light guide plate 600. The liquid crystal panel 100 may include a liquid crystal display plate 120. The liquid crystal display plate 120 may include a liquid crystal layer containing liquid crystal particles. A desired image may be displayed on the liquid crystal panel 100 by controlling the light transmittance of the liquid crystal particles. The liquid crystal panel 100 may further include a first polarization plate 130 and a second polarization plate 110. The first polarization plate 130 and the second polarization plate 110 may be disposed on an upper surface and a lower surface of the liquid crystal display plate 120, respectively.

The liquid crystal display 1000 may further include a top cover 200, the optical sheet 400, an adhesive layer 500, and a substrate 720. The top cover 200 may form the external appearance of top and lateral surfaces of the liquid crystal display 1000, and may be disposed on the liquid crystal panel 100. However, aspects of the example embodiments are not limited thereto. According to some embodiments, a height of the top cover 200 may be substantially the same as a height of the liquid crystal panel 100.

The optical sheet 400 may be disposed on the upper surface 610 of the light guide plate 600. The optical sheet 400 may control optical properties of the light supplied from the light guide plate 600 to the liquid crystal panel 100. For example, the optical sheet 400 may include a diffusion film, a phase difference film, a retardation film, a reflective polarization film, and so on. The optical sheet 400 will now be described in more detail with reference to FIG. 5.

Figure 5:
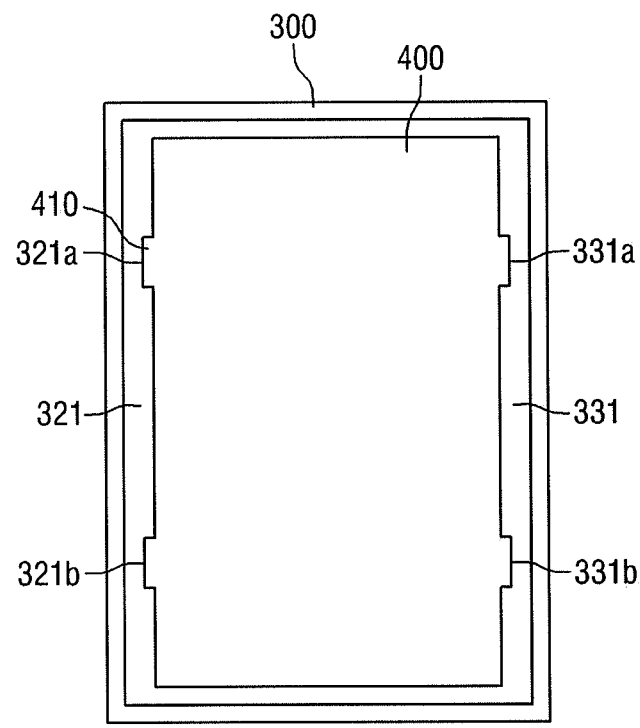
FIG. 5 is a plan view illustrating an optical sheet assembled with an accommodation member according to an embodiment.

FIG. 5 is a plan view illustrating the optical sheet 400 on the accommodation member 300 according to an embodiment. Referring to FIG. 5, the optical sheet 400 may include multiple ear portions 410. The ear portions 410 may be shaped to outwardly protrude from the lateral surface of the optical sheet 400.

For example, as illustrated in FIG. 5, the optical sheet 400 may include four ear portions 410. However, the number of the ear portions 410 included in the optical sheet 400 may vary according to embodiments.

The first sill portion 321 and the second sill portion 331 may include guide grooves 321a and 321b and 331a and 331b, respectively. The guide grooves 321a and 321b, and 331a, and 331b may be recessed from ends of the first sill portion 321 and the second sill portion 331 to the outside of the liquid crystal display 1000, respectively. For example, the guide grooves 321a and 321b and 331a, and 331b may be slits, e.g., openings, formed in the first and second sill portions 331 and 332 along a direction parallel to a line connecting the first and second sill portions 331 and 332.

The guide grooves 321a, 321b, 331a, and 331b may be formed at locations corresponding to the four ear portions 410, respectively. Accordingly, the four ear portions 410 may be disposed in, i.e., inside, the guide groove 321a, 321b, 331a, and 331b, respectively. If the ear portions 410 are disposed in the guide grooves 321a, 321b, 331a, and 331b, respectively, alignment of the optical sheet 400 can be easily achieved. The arrangement and number of the guide grooves 321a, 321b, 331a, and 331b may vary according to the arrangement and number of the ear portions 410.

The adhesive layer 500 may be disposed between the optical sheet 400 and the light guide plate 600 and may adhere the optical sheet 400 and the light guide plate 600 to each other. The adhesive layer 500 may be optically transparent. According to some embodiments, the adhesive layer 500 may not be provided.

The light source 710 may be adjacent to the third side surface 650 and may be disposed to face the third side surface 650. The light source 710 may generate light and supply the same to the light guide plate 600, and the light generated from the light source 710 may be incident into the third side surface 650 of the light guide plate 600. The light source 710 may be a light emitting diode (LED), a cold cathode fluorescent lamp (CCFL), or other various types of light generating elements. When the upper surface 610 and the lower surface 620 are parallel with each other, the liquid crystal display 1000 may further include a light source adjacent to the fourth side surface 660 in addition to the third side surface 650.

The substrate 720 may be connected to the light source 710 to control the light source 710. The light source 710 may be disposed on the substrate 720.

Figure 6:
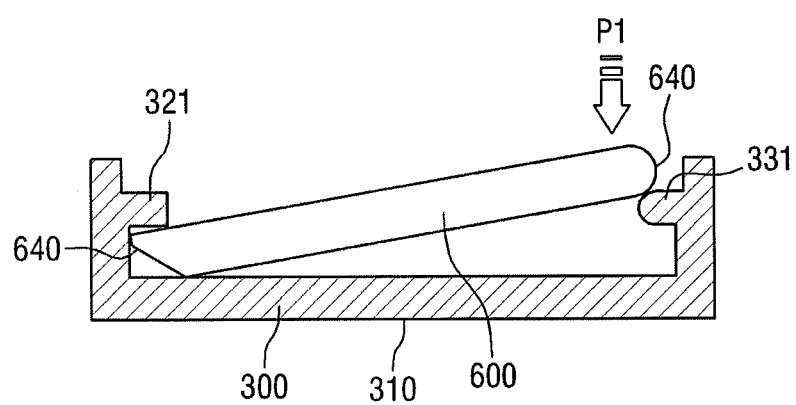
FIG. 6 is a cross-sectional view illustrating positioning of a light guide plate in an accommodation member according to an embodiment.

Hereinafter, a method of accommodating the light guide plate 600 in the accommodation member 300 will be described in more detail with reference to FIG. 6. FIG. 6 is a cross-sectional view illustrating positioning of the light guide plate 600 in the accommodation member 300 according to an embodiment.

Referring to FIG. 6, in order to accommodate the light guide plate 600 in the accommodation member 300, the first side surface 630 may be inserted into a space between the first sill portion 321 and the bottom surface 310. As described above, since the first side surface 630 may include the inclined surface 632 forming an acute angle with respect to the upper surface 610, the thickness of the edge of the light guide plate 600 disposed between the bottom surface 310 and the first sill portion 321 does not exceed a distance between the bottom surface 310 and the first sill portion 321, thereby preventing the light guide plate 600 or the accommodation member 300 from being deformed and facilitating assembling of the light guide plate 600 and the accommodation member 300.

In order to accommodate the light guide plate 600 in the accommodation member 300, after the first side surface 630 is inserted into the space between the first sill portion 321 and the bottom surface 310, a force may be applied to a region adjacent to the second side surface 640 of the light guide plate 600 disposed on the second sill portion 331 in a P1 direction. Since the second side surface 640 has a round shape, it can be easily inserted into the space between the second sill portion 331 and the bottom surface 310. In addition, if the second sill portion 331 has a round end, inserting the second side surface 640 into the space between the first sill portion 321 and the bottom surface 310 may further be facilitated.

As described above, the light guide plate 600 according to the embodiment may be stably assembled with the accommodation member 300 without using ear portions. Accordingly, the light guide plate 600 may be stable within the accommodation member 300 without being visible on the liquid crystal panel 100, e.g., as opposed to a conventional light guide plate with ear portions. Therefore, display quality of the liquid crystal display 1000 may be improved.

Figure 7:
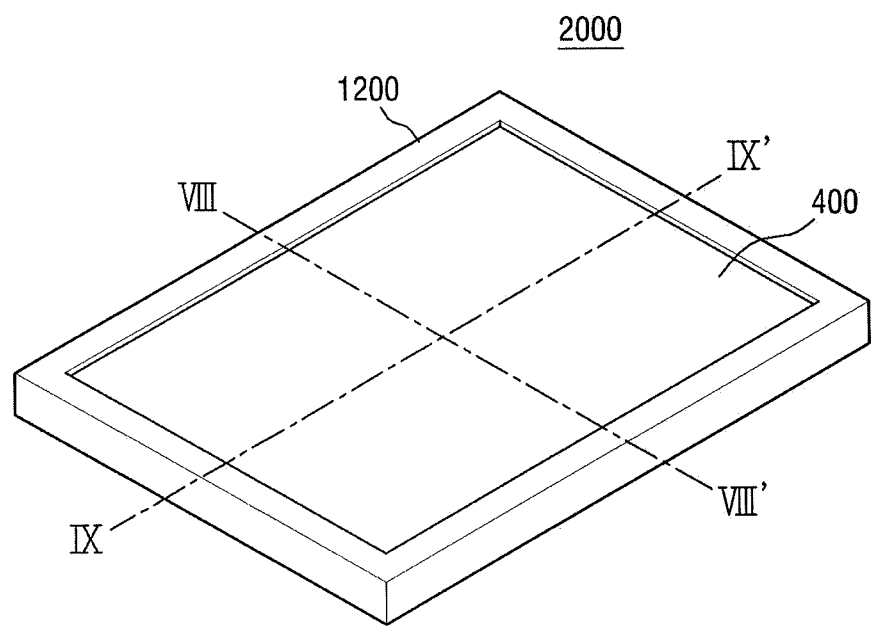
FIG. 7 is a perspective view of a backlight unit according to another embodiment.

Hereinafter, a backlight unit according to another embodiment will be described in more detail with reference to FIGS. 7 to 9. FIG. 7 is a perspective view of a backlight unit according to another embodiment, FIG. 8 is a cross-sectional view along line VIII-VIII' of FIG. 7, and FIG. 9 is a cross-sectional view along line IX-IX' of FIG. 7.

Figure 8:
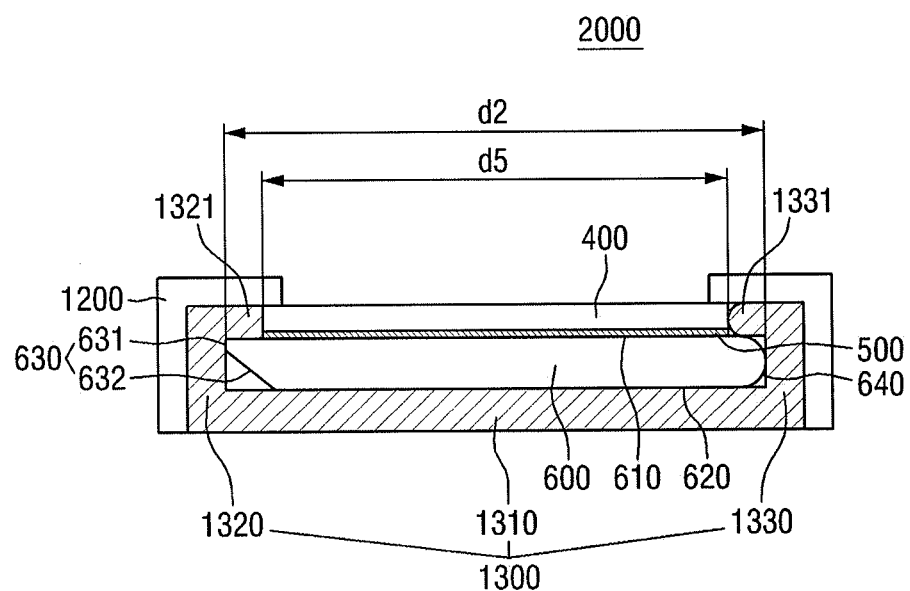
FIG. 8 is a cross-sectional view along line VIII-VIII' of FIG. 7.
Figure 9:
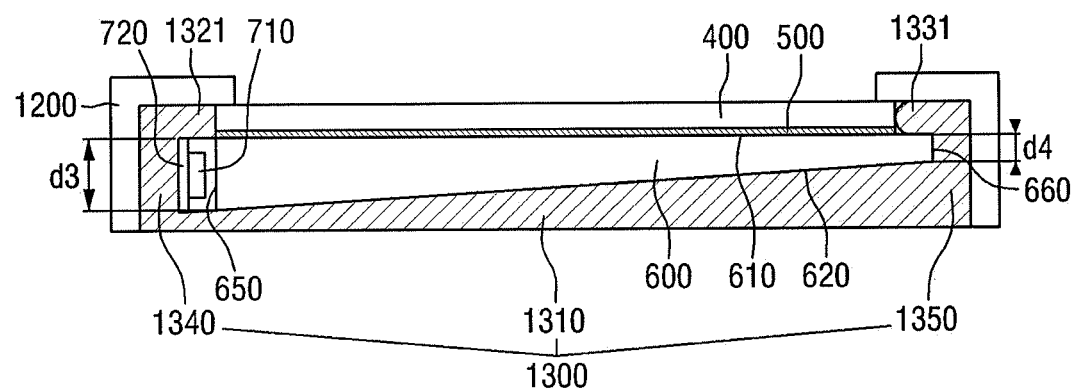
FIG. 9 is a cross-sectional view along line IX-IX' of FIG. 7.

Referring to FIGS. 7 to 9, a backlight unit 2000 includes an accommodation member 1300 and a light guide plate 600.

The accommodation member 1300 may accommodate the light guide plate 600 and a light source 710 and an optical sheet 400, which will later be described. The accommodation member 1300 may include a bottom surface 1310 and sidewalls 1320, 1330, 1340 and 1350. The sidewalls 1320, 1330, 1340 and 1350 may upwardly extend from the periphery of the bottom surface 1310 and are shaped to surround the bottom surface 1310.

The sidewalls 1320, 1330, 1340 and 1350 may include first to fourth sidewalls 1320, 1330, 1340 and 1350. The first sidewall 1320 and the second sidewall 1330 may face each other, and the third sidewall 1340 and the fourth sidewall 1350 may face each other.

The first sidewall 1320 and the second sidewall 1330 may include a first sill portion 1321 and a second sill portion 1331 protruding to the inside of the accommodation member 1300, respectively. A distance d5 between the first sill portion 1321 and the second sill portion 1331 may be smaller than a distance d2 between the upper surface 610 of the light guide plate 600 and each of the first side surface 630 and the second side surface 640. Therefore, the first sill portion 1321 and the second sill portion 1331 may prevent the light guide plate 600 accommodated in the accommodation member 1300 from being deviated from the accommodation member 1300. The second sill portion 1331 may have a round end. If the end of the second sill portion 1331 is round, the second side surface 640 of the light guide plate 600 can be easily inserted into a lower portion of the second sill portion 1331.

As shown in FIG. 9, when the lower surface 620 of the light guide plate 600 is inclined, an upper surface of a bottom part 1310 may also be inclined, but aspects of the example embodiments are not limited thereto. For example, the upper surface of the bottom part 1310 may be planar.

The first to fourth side surfaces 630, 640, 650, and 660 of the light guide plate 600 may be disposed to face the first to fourth sidewalls 1320, 1330, 1340, and 1350, respectively. Since the first side surface 630 includes the inclined surface 632, it is possible to make a thickness of the light guide plate 600 disposed between the bottom surface 1310 and the first sill portion 1321 not exceed a distance between the bottom surface 1310 and the first sill portion 1321 when the first side surface 630 is inserted into a lower portion of the first sill portion 1321 to assemble the light guide plate 600 with the accommodation member 1300. Therefore, the light guide plate 600 or the accommodation member 1300 may be prevented from being deformed and assembly of the light guide plate 600 and the accommodation member 1300 may be facilitated.

Since the second side surface 640 has a round shape, it can be easily inserted into the lower portion of the second sill portion 1331 when the light guide plate 600 is fastened to the accommodation member.

The method of accommodating the light guide plate 600 in the accommodation member 1300 may be substantially the same as the method of accommodating the light guide plate 600 in the accommodation member 300, as shown in FIG. 6. The backlight unit 2000 may further include the top cover 1200, the optical sheet 400, the adhesive layer 500, the light source 710, and the substrate 720.

The top cover 1200 may form the external appearance of top and lateral surfaces of the backlight unit 2000. The top cover 1200 may be disposed on the liquid crystal panel 100, but aspects of the example embodiments are not limited thereto. According to some embodiments, the top cover 1200 may not be provided.

Figure 10:
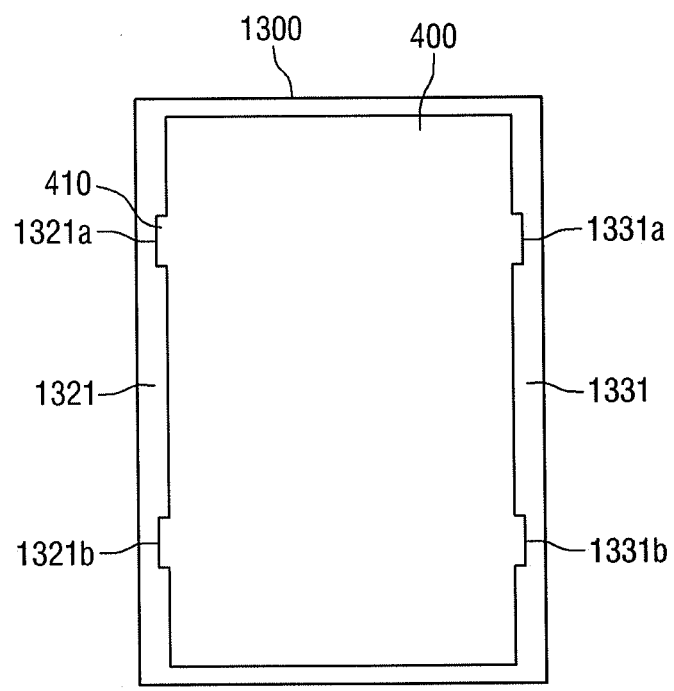
FIG. 10 is a plan view illustrating an optical sheet assembled with an accommodation member according to another embodiment.

Hereinafter, a method of accommodating the optical sheet 400 in the accommodation member 1300 will be described in more detail with reference to FIG. 10. FIG. 10 is a plan view illustrating the optical sheet 400 assembled with the accommodation member 1300 according to another embodiment.

Referring to FIG. 10, a first sill portion 1321 and a second sill portion 1331 may include guide grooves 1321a, 1321b, 1331a, and 1331b, respectively. The guide grooves 1321a, 1321b, 1331a, and 1331b may be recessed from ends of the first sill portion 1321 and the second sill portion 1331 to the outside of the backlight unit 2000, respectively. The guide groove 1321a, 1321b, 1331a, and 1331b may be formed at locations corresponding to the four ear portions 410, respectively, and the four ear portions 410 may be disposed in the guide grooves 1321a, 1321b, 1331a, and 1331b, respectively. If the ear portions 410 are disposed in the guide grooves 1321a, 1321b, 1331a, and 1331b, respectively, alignment of the optical sheet 400 can be easily achieved. The arrangement and number of the guide grooves 1321a, 1321b, 1331a, and 1331b may vary according to the arrangement and number of the ear portions 410.

According to example embodiments, a liquid crystal display may have a light guide plate without an ear portion, so the light guide plate cannot be viewed through a liquid crystal panel, e.g., as compared to a conventional light guide plate with ear portions. Accordingly, display properties of the liquid crystal display may be improved. In addition, the light guide plate has at least one inclined surface to facilitate insertion and stability thereof in an accommodation member, thereby facilitating assembly of the liquid crystal display or a backlight unit.

In contrast, a conventional liquid crystal display may have a light guide plate with an ear portion that is visible through the liquid crystal panel, so light distribution efficiency may deteriorate at the ear portion. For example, an area of the liquid crystal panel corresponding to the ear portion may be viewed more brightly than other areas. As such, the visibility of the brightly lit ear portion may deteriorate display quality of the conventional liquid crystal display.

While the example embodiments has been particularly shown and described with reference to exemplary embodiments thereof, it will be understood by those of ordinary skill in the art that various changes in form and details may be made therein without departing from the spirit and scope of the example embodiments as defined by the following claims. It is therefore desired that the present embodiments be considered in all respects as illustrative and not restrictive, reference being made to the appended claims rather than the foregoing description to indicate the scope of the invention.

What is claimed is:

1. A backlight unit, comprising:
an accommodation member including a bottom part and sidewalls surrounding the bottom part, the sidewalls including:
a first sidewall, the first sidewall including a first sill portion protruding to the inside of the accommodation member, and
a second sidewall facing the first sidewall, the second sidewall including a second sill portion protruding to the inside of the accommodation member, a distance between the first sill portion and the second sill portion being smaller than a distance between the first sidewall and the second sidewall;
a light source in the accommodation member; and
a light guide plate in the accommodation member, the light guide plate being between the bottom part and the first and second sill portions, and the light guide plate including:
an upper surface adjacent to the first sill portion and the second sill portion,
a lower surface facing the upper surface,
a first side surface connecting the lower surface to the upper surface, the first side surface including an inclined surface defining an acute angle with respect to the upper surface,
a second side surface connecting the upper surface and the lower surface, the second side surface being a rounded surface and facing the first side surface,
a third side surface connecting the upper surface and the lower surface, the third side surface being adjacent to the light source, and
a fourth side surface connecting the upper surface and the lower surface, the fourth side surface facing the third side surface.

2. The backlight unit of claim 1, wherein a distance between the upper surface and the lower surface along the fourth side surface is smaller than a distance between the upper surface and the lower surface along the third side surface.

3. The backlight unit of claim 1, wherein an end of the second sill portion is round.

4. The backlight unit of claim 1, wherein the first side surface is positioned between the upper surface and the lower surface and further includes a connecting surface connecting the upper surface and the inclined surface.

5. The backlight unit of claim 4, wherein the connecting surface is substantially perpendicular with respect to the upper surface.

6. A backlight unit, comprising:
an accommodation member including a bottom part and sidewalls surrounding the bottom part, the sidewalls including:
  a first sidewall, the first sidewall including a first sill portion protruding to the inside of the accommodation member, and
  a second sidewall facing the first sidewall, the second sidewall including a second sill portion protruding to the inside of the accommodation member, a distance between the first sill portion and the second sill portion being smaller than a distance between the first sidewall and the second sidewall;
a light guide plate in the accommodation member, the light guide plate being between the bottom part and the first and second sill portions, and the light guide plate including:
  an upper surface adjacent to the first sill portion and the second sill portion,
  a lower surface facing the upper surface,
  a first side surface connecting the lower surface to the upper surface, the first side surface including an inclined surface defining an acute angle with respect to the upper surface, and
  a second side surface connecting the upper surface and the lower surface, the second side surface being a rounded surface and facing the first side surface; and
a guide groove inside at least one of the first and second sill portions, the guide groove extending from an end of the at least one first or second sill portions toward an external surface of the accommodation member.

7. The backlight unit of claim 6, further comprising an optical sheet on the upper surface of the light guide plate, the optical sheet including an ear portion protruding from a side surface and disposed inside the guide groove.

8. A liquid crystal display, comprising:
an accommodation member including a bottom part and sidewalls surrounding the bottom part, the sidewalls including:
  a first sidewall, the first sidewall including a first sill portion protruding to the inside of the accommodation member, and
  a second sidewall facing the first sidewall, the second sidewall including a second sill portion protruding to the inside of the accommodation member, a distance between the first sill portion and the second sill portion being smaller than a distance between the first sidewall and the second sidewall;
a light source in the accommodation member;
a light guide plate in the accommodation member, the light guide plate being between the bottom part and the first and second sill portions, and the light guide plate including:
  an upper surface adjacent to the first sill portion and the second sill portion,
  a lower surface facing the upper surface,
  a first side surface connecting the lower surface to the upper surface, the first side surface including an inclined surface defining an acute angle with respect to the upper surface,
  a second side surface connecting the upper surface and the lower surface, the second side surface being a rounded surface and facing the first side surface,
  a third side surface connecting the upper surface and the lower surface, the third side surface being adjacent to the light source, and
  a fourth side surface connecting the upper surface and the lower surface, the fourth side surface facing the third side surface; and
a liquid crystal panel positioned on the light guide plate.

9. The liquid crystal display of claim 8, wherein a distance between the upper surface and the lower surface along the fourth side surface is smaller than a distance between the upper surface and the lower surface along the third side surface.

10. The liquid crystal display of claim 8, wherein an end of the second sill portion is round.

11. The liquid crystal display of claim 8, wherein the first side surface further includes a connecting surface between the upper surface and the inclined surface and connecting the upper surface and the inclined surface.

12. The liquid crystal display of claim 11, wherein the connecting surface is substantially perpendicular to the upper surface.

13. A liquid crystal display, comprising:
an accommodation member including a bottom part and sidewalls surrounding the bottom part, the sidewalls including:
  a first sidewall, the first sidewall including a first sill portion protruding to the inside of the accommodation member, and
  a second sidewall facing the first sidewall, the second sidewall including a second sill portion protruding to the inside of the accommodation member, a distance between the first sill portion and the second sill portion being smaller than a distance between the first sidewall and the second sidewall;
a light guide plate in the accommodation member, the light guide plate being between the bottom part and the first and second sill portions, and the light guide plate including:
  an upper surface adjacent to the first sill portion and the second sill portion,
  a lower surface facing the upper surface,
  a first side surface connecting the lower surface to the upper surface, the first side surface including an inclined surface defining an acute angle with respect to the upper surface, and
  a second side surface connecting the upper surface and the lower surface, the second side surface being a rounded surface and facing the first side surface;
a liquid crystal panel positioned on the light guide plate; and
an optical sheet on the upper surface of the light guide plate, the optical sheet including an ear portion protruding from its side surface,
wherein at least one of the first and second sill portions including a guide groove recessed toward an external surface of the accommodation member, the ear portion of the optical sheet being inside the guide groove.

* * * * *